(12) United States Patent
Dillon

(10) Patent No.: US 6,167,982 B1
(45) Date of Patent: Jan. 2, 2001

(54) STEERING SYSTEM FOR AN ARTICULATED TRACKED COMBINE

(76) Inventor: Ben N. Dillon, 206 Greensprings Dr., Columbus, OH (US) 43235

(*) Notice: Under 35 U.S.C. 154(b), the term of this patent shall be extended for 0 days.

(21) Appl. No.: 09/210,331

(22) Filed: Dec. 11, 1998

(51) Int. Cl.$^7$ .................................................. B53D 53/00
(52) U.S. Cl. ........................ 180/419; 180/418; 180/6.24
(58) Field of Search ..................... 180/6.24, 6.3, 180/6.64, 9.34, 9.38, 418, 419

(56) References Cited

U.S. PATENT DOCUMENTS

| | | | |
|---|---|---|---|
| H1846 | * 4/2000 | Poorman | 180/418 |
| 3,699,676 | * 10/1972 | Beck | 60/52 S |
| 3,783,963 | * 1/1974 | Erwin | 180/6.3 |
| 4,565,257 | * 1/1986 | Hanson | 180/135 |
| 4,771,851 | * 9/1988 | Nystuen et al. | 180/135 |
| 4,802,545 | * 2/1989 | Nystuen et al. | 180/135 |
| 4,966,242 | * 10/1990 | Bailllargeon | 180/9.44 |
| 5,180,028 | * 1/1993 | Perrenoud, Jr. | 180/235 |
| 5,489,005 | * 2/1996 | Marcott et al. | 180/134 |
| 5,520,262 | * 5/1996 | Marcott | 180/418 |
| 5,533,587 | * 7/1996 | Dow et al. | 180/235 |
| 5,579,863 | * 12/1996 | Nelson et al. | 180/418 |
| 5,725,063 | * 3/1998 | Ceragioli et al. | 180/14.4 |
| 5,908,081 | * 6/1999 | Olson | 180/419 |
| 6,012,272 | * 1/2000 | Dillon | 56/14.6 |
| 6,016,885 | * 1/2000 | Hickman et al. | 180/418 |
| 6,039,133 | * 3/2000 | Zulu | 180/6.64 |

* cited by examiner

*Primary Examiner*—J. J. Swann
*Assistant Examiner*—L. Lum
(74) *Attorney, Agent, or Firm*—Mueller & Smith, LPA

(57) ABSTRACT

One aspect of the present invention relates to a steering system for an articulated tracked combine composed of (i) a forward unit having a pair of differentially-connected powered non-steering wheels or tracks and (ii) a tracked rearward unit having powered steerable tracks. This steering system includes a pivoting articulation joint interconnecting the forward unit and the rearward unit. The rearward unit is fitted with a differential tracked steering system in steering connection with an operator steering wheel for steering of the articulated tracked combine. Optionally, such novel steering system includes a pair of steering articulation cylinder assemblies connected between the forward unit and the rearward unit. An angle sensor is mounted at the joint for sensing the relative position of the forward unit and the rearward unit. Another sensor is mounted at the steering wheel to sense its position. A controller is connected with the angle sensor and with the steering wheel sensor for monitoring their concordance and for activating the steering articulation cylinder assemblies when the concordance varies by a threshold value in order to re-establishes the concordance within the threshold value.

4 Claims, 5 Drawing Sheets

STEERING SYSTEM FOR AN ARTICULATED TRACKED COMBINE

CROSS-REFERENCE TO RELATED APPLICATIONS

This application is cross-referenced to Applicant's application Ser. No. 09/040,985, filed on Mar. 18, 1998, now U.S. Pat. No. 6,012,272 the disclosure of which is expressly incorporated herein by reference.

STATEMENT REGARDING FEDERALLY SPONSORED RESEARCH

Not Applicable.

BACKGROUND OF THE INVENTION

The present invention generally relates to combines and more particularly to a tracked articulated (jointed) combine with improved tracked steering system capability.

Tracked vehicles, which utilize metallic sectioned tracks or rubber traction belts, have been steered historically by establishing a speed differential between the endless tracks on opposite sides of the vehicle. Means causing the track on the right side of the vehicle to stop or run slower than the track on the left side of the vehicle causes the vehicle to turn to the right and vice versa if the progress of the left track is retarded. Such turning regimen initially was accomplished by clutch/brakes affixed to the individual tracks for retarding movement of the track. Such a steering regimen results in abrupt steering changes and in the retarded track sliding sideways with a resulting dirt pile being established on the outside of the sliding track and high stress on the vehicle suspension.

Another tracked vehicle steering system is a proportion steering system. This steering system for tracked vehicles causes a speed differential to be created between the two tracks rather than retarding one of the tracks. This "differential steering" system was an improvement in that the turns were less abrupt, less dirt was piled up because sliding of the inside track was less, and the suspension system was subject to less stress, as some power was being applied to both tracks during the turn. A common implementation of a differential steering system involved driving each track with its own hydraulic motor with the relative flow of hydraulic fluid in a hydrostatic transmission arrangement being diverted to either track utilizing a diverter/divider valve controlled by the vehicle operator. The two hydraulic motors, then, provided both propulsion and steering. In a straight-ahead direction, both motors receive the same percentage of the total flow of fluid from the hydrostatic pump. To perform a turn to the right, say, the percentage of the total hydraulic fluid or oil flow to the right side motor is decreased with a simultaneous and concomitant increase in oil flow to the left side motor. A reverse flow is used for a left turn.

Differential steering also can be achieved by utilizing a hydraulic motor which, when receiving flow from a steering wheel activated pump, applies power to a mechanical differential which is connected to both tracks. Such a steering system is shown in Caterpillar Company brochure # YEDA 3003 (September 1997).

While differential steering represents a definite improvement in the art of tracked vehicle steering, such systems are not without their own problems and limitations. To be effective in guiding a vehicle, particularly an articulated combine, the differential steering system depends on both endless tracks or belts encountering relatively the same traction conditions. Since these vehicles operate in agricultural fields with widely varying soil and soil moisture conditions, a wide differential of track traction can be encountered from one side of the vehicle to the other.

Such differential traction problem is illustrated by the following example. The vehicle operator desires to turn the combine to the right and, accordingly, turns the steering wheel to the right. The ground, however, is firmer and less slippery on the right side of the vehicle under the right track or belt than under the left side. The differential steering system causes the left side track to speed up and the right side track to slow down to effect a turn to the right. However, because the right side track has more traction than the left, increasing the speed (power) of the left track merely causes it to "spin" in the loose soil or mud and it will be overpowered by the slower turning, but better tractioned, right track. The net result of these circumstances is that the vehicle will slide or turn left when the operator is calling for a right turn even though the steering system is trying to turn the vehicle to the right. Moreover, this slide or turn (drift) to the left will continue until the left side track encounters soil with at least as good, or better traction than the right side track. At this point in the turn, however, the operator has probably strongly "oversteered" to the right and the left track is running much faster than the right. When the left track encounters firm soil, the vehicle will lunge to the right before the operator can recover.

This steering limitation can be mitigated somewhat in a tractor application by reducing the load from the towed implement by raising it until more equal left/right soil conditions are encountered. However, the operator of a combine does not have this option since he cannot reduce the load and must follow precisely the rows or position of the crop to be harvested.

Thus, it will be readily apparent that there exists a real need for improving the steering of tracked vehicles in general and of tracked combines specifically.

BRIEF SUMMARY OF THE INVENTION

Broadly, one aspect of the present invention relates to a steering system for an articulated tracked combine composed of (i) a forward unit having a pair of powered non-steering wheels or tracks (fitted with a differential in their axle) and (ii) a tracked rearward unit having powered steerable tracks. This steering system includes a pivoting articulation joint interconnecting the forward unit and the rearward unit. The rearward unit is fitted with a differential tracked steering system in steering connection with an operator steering wheel for steering of the articulated tracked combine.

Another aspect of the present invention is directed to a steering system for an articulated tracked combine composed of (i) a forward unit having a pair of powered non-steering wheels or tracks and (ii) a tracked rearward unit having steerable tracks, wherein steering of said combine is effected by an operator steering wheel in steering connection with the rearward unit tracks. Such novel steering system includes a pair of steering articulation cylinder assemblies connected between the forward unit and the rearward unit. An articulation joint interconnects the forward unit and the rearward unit. An angle sensor is mounted at the joint for sensing the relative position of the forward unit and the rearward unit. Another sensor is mounted at the steering wheel to sense its position. A controller is connected with the angle sensor and with the steering wheel sensor for monitoring their concordance and for activating the steering articulation cylinder assemblies when the concordance varies by a threshold value in order to re-establishes the concordance within the threshold value.

Advantageously, the controller publishes the output of each sensor to the operator so that the operator knows the relative position of the two units at all times. Also, a manual override also is desirably provided so that the operator can actuate the articulation steering cylinder assemblies as is necessary, desirable, or convenient. Additionally, the operator can call for a combination steering approach by using the articulation steering cylinder assemblies full time. Finally, the operator can manually articulate the tracked combine by actuating the articulation steering cylinder assemblies. Thus, a multitude of steering options are available to the operator of the novel articulated tracked combine of the present invention.

Advantages of the present invention include the ability to readily steer the tracked combine in conventional fashion desirably using a conventional differential tracked steering system. Another advantage is the concomitant ability to overcome slippage of a track during such differential steer automatically so that the operator need only concentrate on steering the combine where desired. A further advantage is the ability of the operator to assist the differential tracked steering system by manually actuating the articulation steering cylinder assemblies. These and other advantages will be readily apparent to those skilled in the art based on the instant disclosure.

BRIEF DESCRIPTION OF THE DRAWINGS

For a fuller understanding of the nature and objects of the present invention, reference should be had to the following detailed description taken in connection with the accompanying drawings in which.

The drawings will be described in detail below.

DETAILED DESCRIPTION OF THE INVENTION

In the articulated combine utilizing both tracks and pneumatic tires as disclosed in U.S. Pat. No. 6,012,272 ('272 patent) (cited above), it is preferable to steer the combination vehicle utilizing a differential steering system on the track type belts and wheels supporting the rearward grain carrying unit. The rearward unit will be heavily loaded and differential steering minimizes the horizontal sliding of the traction belts. The articulation joint of the combine is equipped with conventional steering cylinder assemblies appropriate for steering an articulated vehicle by conventional applying force to either side of the articulation joint. The joint, however, is unrestricted; that is, it is a freely moveable joint. Steering control over the forward unit, then, relies on the steerable tracks of the tracked rearward unit.

In soil conditions where the traction of both belt drives is acceptable for successful differential steering, the articulation steering cylinder assemblies will be in a "float" or passive mode. In this case, the entire vehicle will be steered by the differential steering on the rear belts. When the rearward until is differentially steered, it will cause the articulation joint to change its angle and point the front of the combine or vehicle in the desired direction. However, when soil conditions are encountered which present different traction possibilities to the drive belts and the differential steering drift, slide or opposite desired turn problem begins to appear, the articulation joint steering cylinder assemblies are used to overcome the problem.

The problem is sensed by comparing an angle sensor mounted at the articulation joint and the position of the steering wheel. If the differential steering system on the drive belts or tracks is not able to establish or maintain the proper turn angle at the articulation joint the operator is requesting due to poor traction, the vehicle steering controller will command the articulation joint steering cylinder assemblies to be energized and force the steering angle requested by the operator through the steering wheel. A manual switch also is provided to allow the operator to energize the joint cylinder assemblies to assist in steering when he foresees a problem. In the "automatic" mode, the articulation joint cylinder assemblies will be de-energized when an acceptable match between the steering wheel position and the joint angle sensor has been maintained for a reasonable and adjustable period of time.

Figure 1:
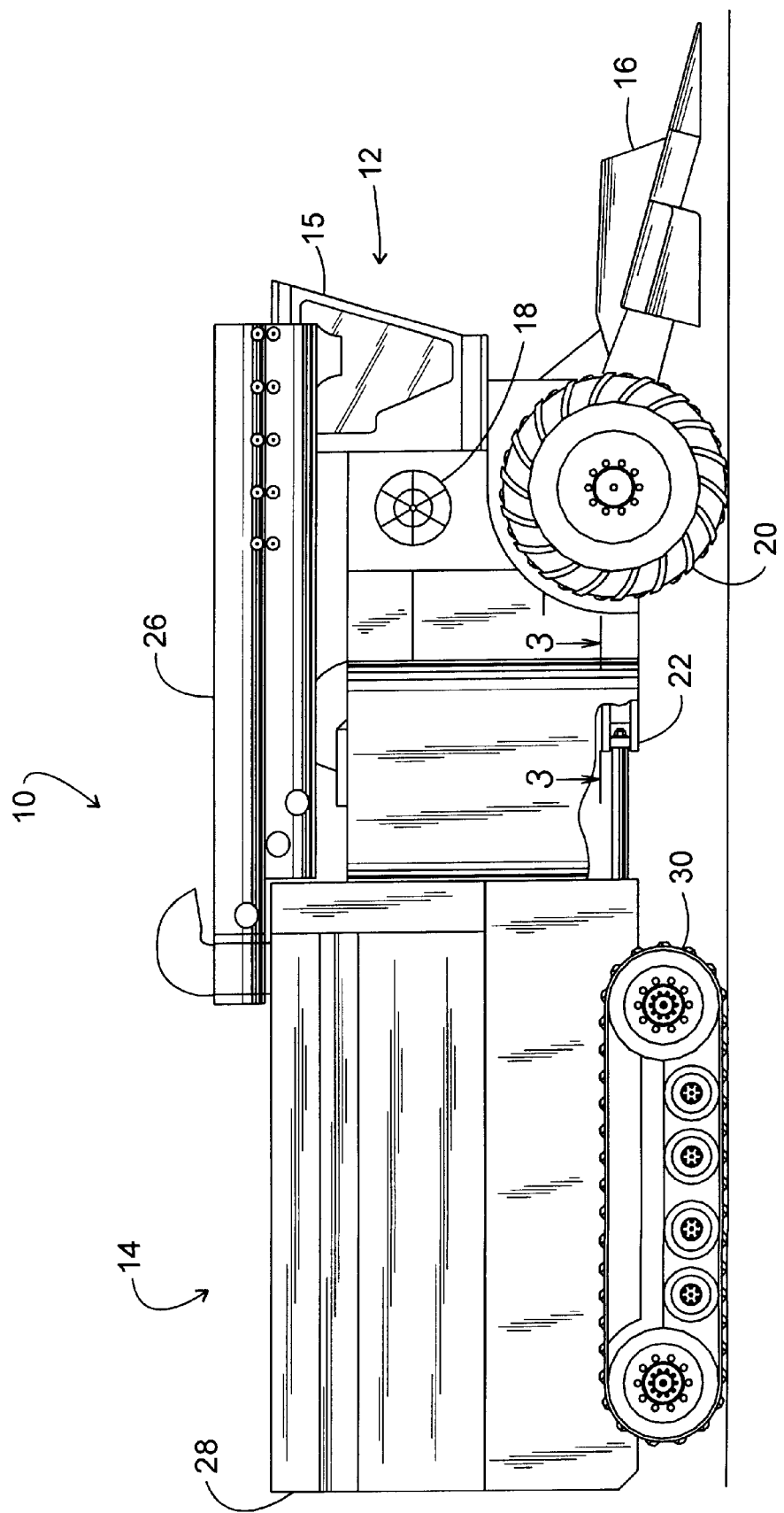
FIG. 1 is a side elevational view of the novel combine (or harvester) with rearward unit tracked drive.
Figure 2:
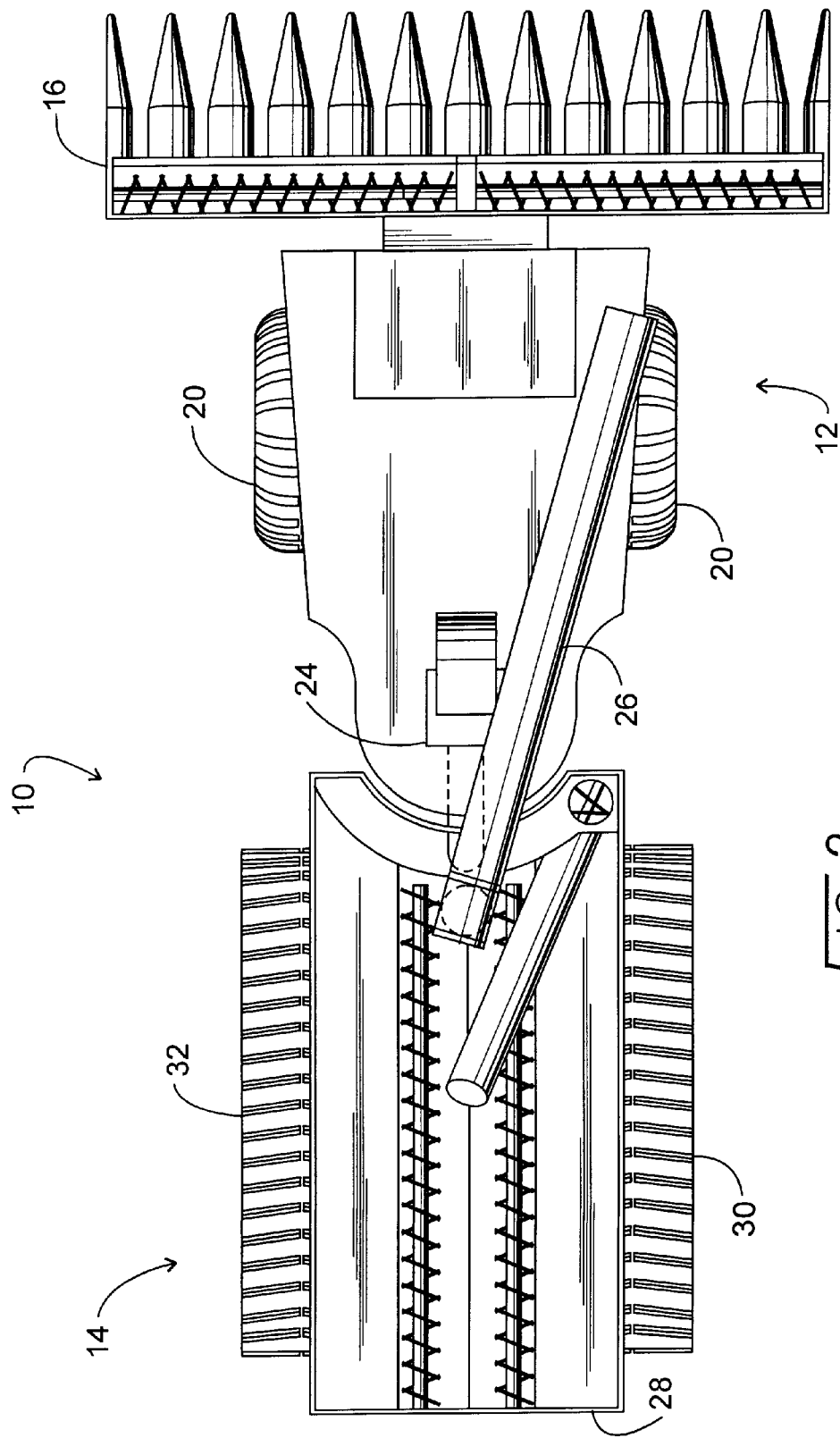
FIG. 2 is an overhead view of the combine depicted in FIG. 1.

Referring initially to FIGS. 1 and 2, innovative combine 10 generally includes forward unit 12 and rearward unit 14. Forward unit 10 is seen to include cab 15 in which the operator is seated, cornhead or small grainhead 16, engine compartment 18 (fan discharge shown in the drawings), and powered non-steerable wheel pair 20. Rearward unit 14 is interconnected to forward unit 12 via joint assembly 22 and clean grain is transferred from forward unit 12 to rearward unit 14 via grain cleaning and transfer assembly 24 seen in FIG. 2. Rearward unit 14 is seen to include clean grain unloading system 26 in its stored position, grain bin 28, and powered and steerable tracks 30 and 32. Use of a tracked configuration of powered and steerable tracks supporting grain bin 28 on rearward unit 14 contributes to the capability of grain bin 28 holding upwards to 1,200 bushels of grain or more. Providing the grain bin capacity only on rearward unit 14 translates into a lower center of gravity for grain bin 28 which also enables such higher storage capacity and provides more even weight distribution per axle.

Operation of cornhead or small grainhead 16, clean grain unloading system, grain bin 28, and like units of combine 10 is accomplished inventively as disclosed in applicant's '272 patent (cited above). Thus, an exhaustive discussion of these components and their operation is omitted here.

Figure 3:
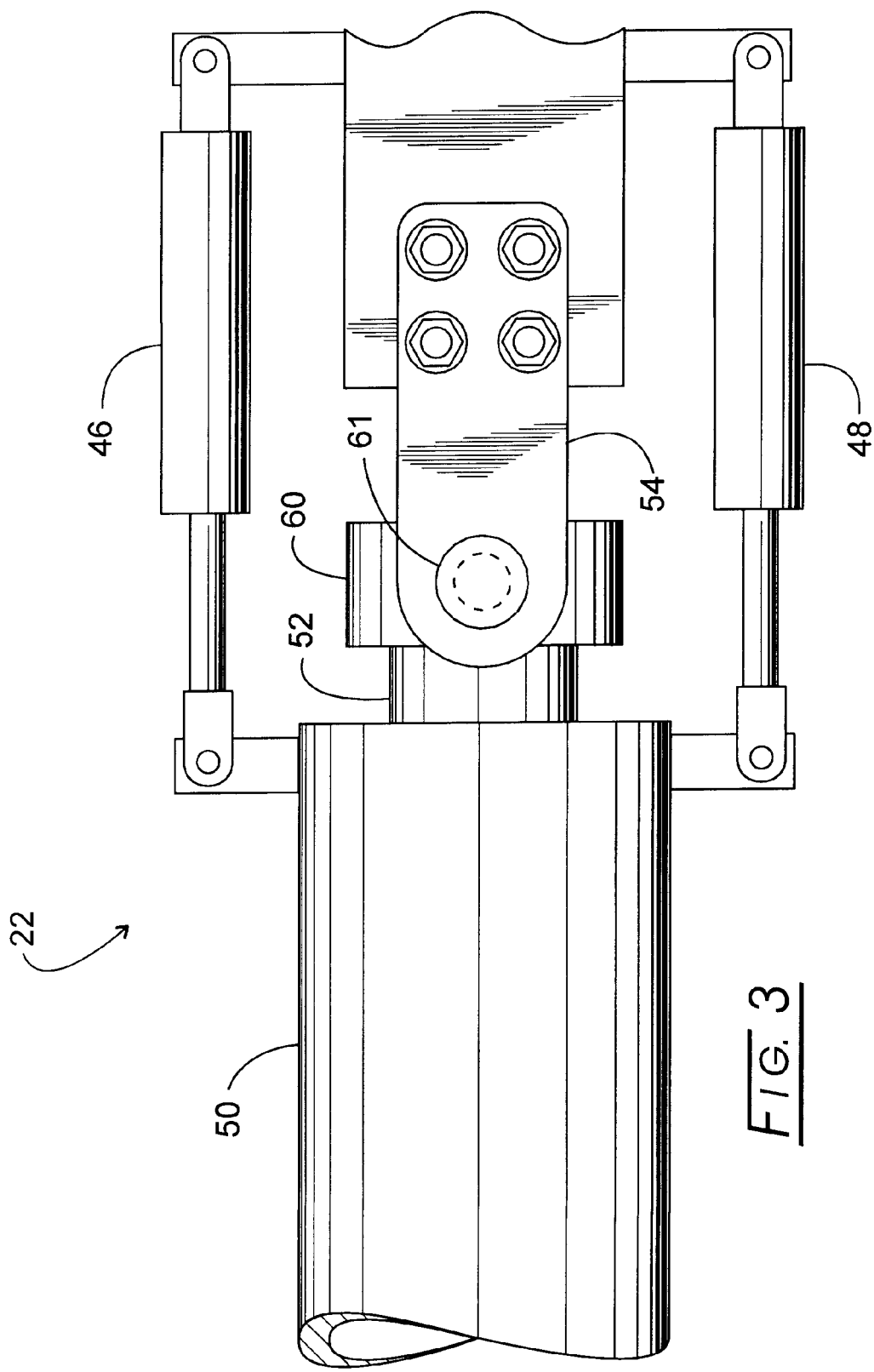
FIG. 3 is a sectional view taken along line 3—3 of FIG. 1.

Joint 22 as depicted in FIG. 3 also is disclosed in applicant's '272 patent (cited above). A pair of steering cylinder assemblies', 46 and 48, is seen to connect forward unit 12 to rearward unit 14 of articulated tracked combine 10. Such steering cylinder assemblies are conventionally used to assist in the steering of articulated vehicles and are provided here for auxiliary steering use in the present articulated tracked combine design. Now, with respect to the two-axis joint, pipe 50 is attached to rearward unit 14 at one end and is constructed as a round pipe or structural tube because it is in the chaff/straw flow path from grain cleaning and transfer assembly 24. Shaft 52 extends from pipe 50 towards forward unit 12 and is inserted into bearing retainer assembly 60 which is inserted between upper frame member 54 and lower frame member 56. These frame members 54 and 56 are shown bolted to forward unit 12, although other attachment means certainly can be envisioned. Joint sensor 61 senses the position of joint assembly 22 (i.e., the relative position of forward unit 12 to rearward unit 14). Other joint configurations can be used as is necessary, desirable, or convenient.

Of importance to the present invention, however, are the problems inherent in the steering of tracked vehicles in general and in the steering of tracked combines in particular. Operation of tracks 30 and 32 for steering purposes preferably is accomplished by differential steering, as described above. Were rearward unit 14 standing alone, steering of it would be routine. However, inventive combine 10 has forward unit 12 affixed thereto via joint assembly 22. Thus, bearing retainer assembly 60 permits shafts 50/52 to rotate or pivot freely thereabouts with provision for bearings as described in applicant's '272 patent (cited above). Of importance is that joint assembly 22 permits units 12 and 14 to freely move with respect to each other therethrough. Thus, steering of combine 10 (and, thus, forward unit 12) is accomplished by tracks 30/32 and their differential steering system. Since forward unit 12 can move freely via joint 22, steering of rearward unit 14 to the left via tracks 30/32 will cause forward unit 12, and, hence, combine 10, to veer to the right, and vice versa. Such steering scheme forms one aspect of the present invention.

Figure 4:
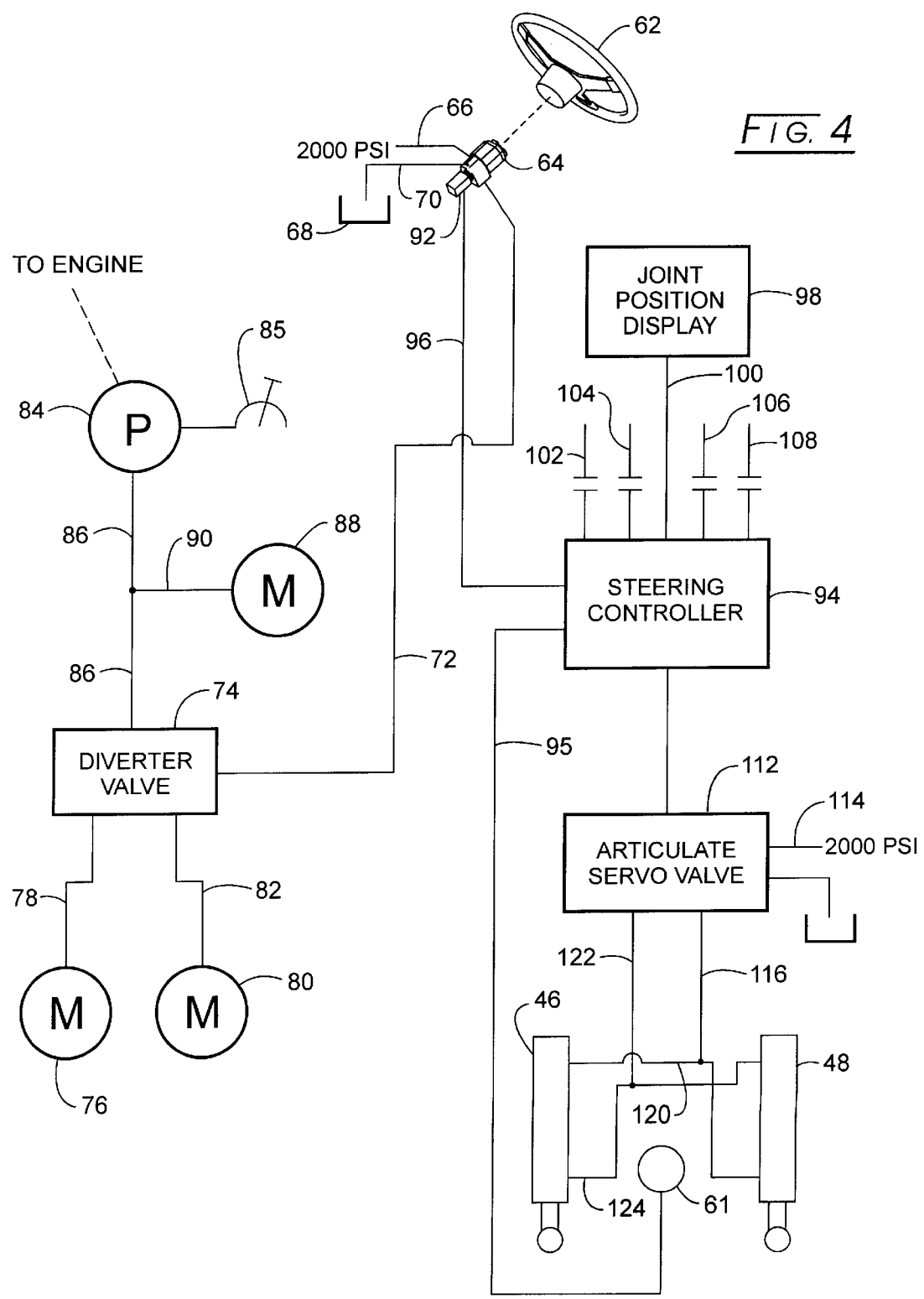
FIG. 4 is a schematic of the hydraulic steering system for the novel tracked articulated combine.

This steering scheme, along with supplemental steering schemes, which form additional embodiments of the present invention, are set forth in FIG. 4. The combine operator in cab 15 steers combine 10 via steering wheel 62 which activates valve 64 which is fed hydraulic fluid via line 66 at, say, 2,000 psi, and also is connected to reservoir 68 via line 70. During normal operation when tracked combine 10 is proceeding in a straight ahead direction, hydraulic fluid or oil is fed from valve 64 via line 72 to diverter valve 74 which proportions the hydraulic fluid equally between left track 32 motor 76 via line 78 and right track 30 motor 80 via line 82.

Power is supplied to motors 76/80 from propulsion hydrostatic pump 84 via line 86. Pump 84 is connected to operator motion control lever 85 and in turn is powered from the engine of combine 10 which also powers via line 90 motor 88 which powers wheel pair 20 of forward unit 12. During such straight ahead movement of combine 10, cylinder assemblies 46/48 are in a "float" mode, that is, they exert no influence over units 12 and 14 and their corresponding servo valve is centered. Steering in this mode is entirely controlled by rear tracks 30/32 differential drive system and freely pivotable joint 22.

Now, when the operator wants to turn combine 10 to the right (right chosen arbitrarily for purposes of illustration), the operator turns steering wheel 62 to the right which actuates valve 64 and via line 72 diverter valve 74 now proportions more hydraulic fluid to motor 80 (right track 30) and a lesser amount of fluid to motor 76 (left track 32). This differential hydraulic fluid flow causes rearward unit 14 to turn to the left and, via joint 22, forward unit 12 (and, hence, combine 10) to the right because wheel pair 20 is fitted with a differential in the axle which connects such wheel pair. When the turn is complete, the operator returns steering wheel 62 to its neutral position which results in diverter valve 74 equalizing the flow of hydraulic fluid to motors 76 and 80, resulting in combine 10 returning to straight ahead movement.

During such a turn, steering wheel sensor 92 sends a signal to steering controller 94 via line 96 which controller also publishes the position of joint 22 as determined by joint sensor 61 (see FIG. 3) in joint position display 98 which is connected to controller 94 via line 100. Joint sensor 61 also sends a signal to controller 94 via line 95. So long as joint sensor 61 and steering wheel sensor 92 are within a threshold value, steering of combine 10 can be accomplished solely by means of the differential steering associated with tracks 30/32. The threshold value is a measure of the difference in readings between steering wheel sensor 92 which represents where the operator has determined that combine 10 should be going during a turn and joint sensor 61 which represents where combine 10 actually is going during a turn. When this differential becomes too large (exceeds the threshold value), collective action is required in order for combine 10 to follow the turn outlined by the operator via steering wheel 62. Such corrective action will be described below.

Now, controller 94 also is fitted with several switches namely, switch 102 for continuous mode operation, switch 104 for manual/automatic mode operation, and switches 106/108 for manual articulation to the left and light, respectively. These modes also will be described below.

When corrective action is required because sensors 61 and 92 indicate that track 30 is slipping during the right hand turn with a consequent difference between these sensors readings above a pre-determined threshold value, in the continuous mode of controller 94 as set by the operator via switch 102, controller 94 sends a signal via line 110 to articulate servo valve 112 which is powered by a source of, say, 2,000 psi hydraulic fluid, via line 114 with return line to reservoir 68 (or another suitable hydraulic fluid reservoir) provided conventionally. Such signal causes valve 112 to transmit hydraulic fluid via line 116 to line 120 to extend left cylinder 46 and retract right cylinder 48 for augmenting the right hand turn called for by the operator. For a left hand turn, valve 112 sends fluid via line 122 to line 124 to retract left hand cylinder 46 and extend right hand cylinder 48. Returning to the right hand turn illustration, cylinder assemblies 46/48 by being activated, force combine 10 to turn to the right, thus overcoming the slippage of track 30. Once concordance between sensors 61 and 92 have been re-established, cylinder assemblies 46/48 work in concert with tracks 30/32 differential steering system to complete tile turn.

Alternatively, the operator could activate switch 104, which would engage cylinder assemblies 46/48 to work full time during turning of combine 10. Yet another alternative available to the operator is to activate switch 106 to manually articulate combine 10 to the right via steering articulation cylinder assemblies 46/48, or switch 108 to manually articulate combine 10 to the left via steering articulation cylinder assemblies 46/48. Thus, the operator has a multitude of steering modes available to steer articulated tracked combine 10.

Figure 5:
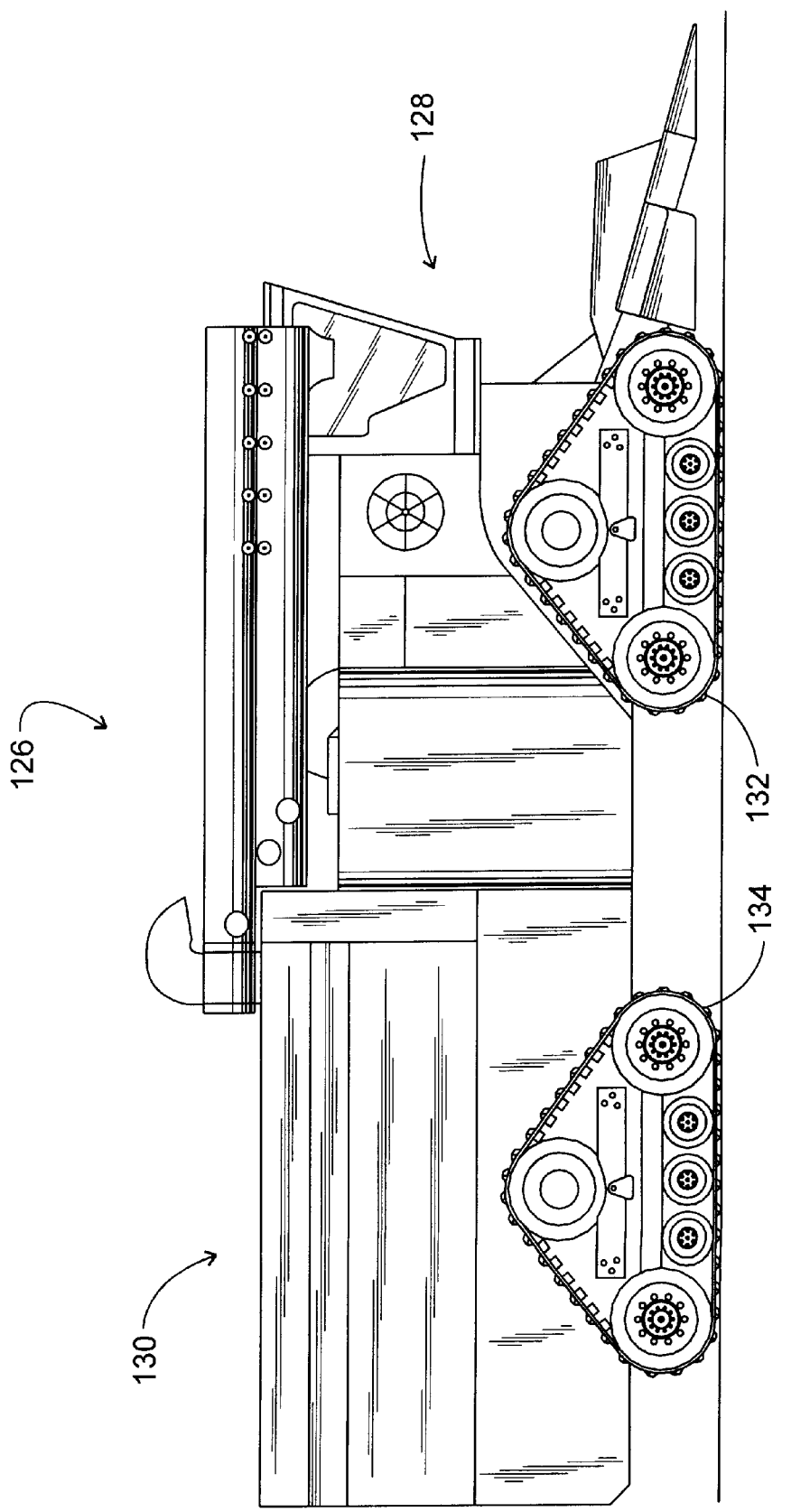
FIG. 5 is a side elevational view of another embodiment of the novel combine depicted in FIG. 1 where the forward unit is tracked.

Referring to FIG. 5, innovative combine 126 generally includes forward unit 128 and rearward unit 130, which are similar in construction to combine 10 depicted in FIG. 1, except for the tracks. Forward unit 128 and rearward unit 130 each are fitted with track systems 132 and 134, respectively. Such track systems are the QUADTRAC™ tracks of Case Corporation (Racine, Wis.), such as is illustrated in their STEIGER® 9300 Series 4WDs brochure (1996). The remainder of operation of combine 126 is like that described in connection with FIGS. 1–4.

It will be appreciated that the foregoing description is illustrative of how the present invention can be practiced, but it should not be construed as limiting the present invention. Finally, all citations referred to herein are expressly incorporated herein by reference.

I claim:

1. A method for steering an articulated tracked combine, which comprises:

(a) providing a combine comprising (i) a forward unit having a pair of powered differentially-connected wheels or tracks not in steering connection with an operator steering wheel and (ii) a tracked rearward unit having powered tracks fitted with a tracked differential steering system in steering connection with said operator steering wheel;

(b) interconnecting said forward unit and said rearward unit with a pivoting articulation joint; and (c) steering said combine by engaging said steering wheel which activates said tracked differential steering system to turn said rearward unit left for said combine to turn right and vice versa.

2. The method of claim 1, which additionally comprises:

(d) interconnecting said forward unit and said rearward unit also with a pair of steering articulation cylinder assemblies;

(e) mounting an angle sensor at said joint for sensing position of said forward unit and said rearward unit;

(f) mounting a sensor at the steering wheel to sense its position; and (g) connecting a controller with said angle sensor and with said steering wheel sensor for monitoring their concordance and for activating said steering articulation cylinder assemblies when said concordance varies by a threshold value in order to re-establish said concordance within said threshold value.

3. The method of claim 2, which additionally comprises:

(h) fitting said controller with an operator switch which activates said steering articulation cylinder assemblies to work continuously with said tracked differential steering system for steering of said combine.

4. The method of claim 2, which additionally comprises:

(i) fitting said controller with operator switches which activate said articulation steering cylinder assemblies for immediately articulating said combine either left or right.

* * * * *